United States Patent
Shoji

[11] Patent Number: 5,844,935
[45] Date of Patent: Dec. 1, 1998

[54] CDMA RECEIVER

[75] Inventor: Takashi Shoji, Tokyo, Japan

[73] Assignee: NEC Corporation, Japan

[21] Appl. No.: 746,131

[22] Filed: Nov. 6, 1996

[30] Foreign Application Priority Data

Nov. 7, 1995 [JP] Japan ................................ 7-288273

[51] Int. Cl.$^6$ ............................. H04B 15/00; H04K 1/00; H04L 27/30
[52] U.S. Cl. ...................... 375/200; 375/200; 375/201; 375/206; 375/208; 375/209; 370/464; 370/479; 370/503; 370/516
[58] Field of Search ..................................... 375/200, 201, 375/202, 203, 204, 205, 206, 207, 208, 209, 210, 354, 357, 359, 360, 361, 362, 364, 365, 367, 368, 370, 371, 373–376; 370/479, 464, 480, 498, 503, 514, 515, 516

[56] References Cited

U.S. PATENT DOCUMENTS

| | | |
|---|---|---|
| 4,630,283 | 12/1986 | Schiff .......................................... 375/1 |
| 5,390,207 | 2/1995 | Fenton et al. ................................. 375/1 |
| 5,619,524 | 4/1997 | Ling et al. .................................. 375/200 |
| 5,659,573 | 8/1997 | Bruckert et al. ........................ 375/200 |

FOREIGN PATENT DOCUMENTS

| | | |
|---|---|---|
| 5-37490 | 2/1993 | Japan . |
| 5-75571 | 3/1993 | Japan . |

*Primary Examiner*—Stephen Chin
*Assistant Examiner*—Michael W. Maddox
*Attorney, Agent, or Firm*—Ostrolenk, Faber, Gerb & Soffen, LLP

[57] ABSTRACT

A spread spectrum receiver includes a chip synchronization circuit controlling a phase of a spreading code for tracking synchronization at a phase control rate which is variable according to a rate control value. The rate control value is determined based on the signal-to-interference power ratio such that the phase control rate becomes lower as the signal-to-interference power ratio is reduced.

25 Claims, 3 Drawing Sheets

CDMA RECEIVER

BACKGROUND OF THE INVENTION

1. Field of the Invention

The present invention generally relates to a multiple-access communications system, and in particular to a receiver and receiving method for use in a CDMA (Code Division Multiple Access) communications system using a spread spectrum (SS) scheme.

2. Description of the Related Art

Power control, as known well, is a necessary function in a CDMA system serving mobile users, because of the near-far problem. On the link from a mobile terminal to the base station, each signal is received with a different amount of path loss due to, for example, variations in distances of the mobile terminals from the base station. Therefore in a case where all the mobile terminals transmit with the same signal power, their signals will arrive at the base station with different power levels. This near-far problem is solved by controlling the power transmitted by each mobile terminal such that the same power level is received at the base station from each mobile terminal. In general, the base station continuously measures the Signal-to-Interference power ratio (hereinafter referred to as SIR) based on the power level of a signal received from a mobile terminal and provides continuous feedback to the mobile terminal so that the mobile terminal can adjust its power level dynamically.

Another power control technique has been proposed in Japanese patent unexamined publication No. 5-75571. In this technique, at the mobile terminal, the power level of a signal received from the base station is measured and then the transmitted signal power is dynamically adjusted according to the received power level.

Still another technique of obtaining SIR of a received signal at a mobile terminal is disclosed in Japanese patent unexamined publication No. 5-37490. According to this publication, SIR is obtained by comparing a desired signal power with all received signal powers and is used to determine whether the communication quality is good. In a case where SIR is lower than a predetermined threshold value, the user is informed of communication impairment by beep sound or blinking light. Therefore, the user can do an immediate corrective action such as reorienting the receiving antenna or the like.

However, the above conventional receivers in the base station or the mobile terminal provide the following disadvantages. First, in a case where the base station receives a signal with relatively low SIR from a mobile terminal due to multiple-user interference and/or transmission channel distortion, there is a possibility that a synchronization tracking system causes the receiving timing to be locked to a noise signal. Since such a receiving timing error is interpreted as impaired SIR, the power control system of the base station increases the power transmitted by the mobile terminal until reaching the maximum transmission power level. The increased transmission power causes the reduced battery life.

Further, since the receiving antenna of the base station cannot be easily reoriented, it is very difficult to employ the conventional receiver in the base station.

SUMMARY OF THE INVENTION

An object of the present invention is to provide a receiver and receiving method which achieve an stable receiving operation even when SIR is relatively low.

Another object of the present invention is to provide a receiver and receiving method which is able to provide the reliable receiving reference timing which ensures a stable communication quality and a stable transmission power control.

According to the present invention, a phase control operation for synchronization tracking is performed at a variable rate. The variable rate is determined depending on a magnitude of the signal power relative to the interference power such as a signal-to-interference power ratio (SIR).

A spread spectrum receiver according to the present invention is comprised of a chip sync circuit for controlling a phase of a spreading code for tracking synchronization at a phase control rate to produce a despreading code, wherein the phase control rate is variable according to a rate control value. A rate control value for controlling the phase control rate is determined based on a magnitude of the signal power relative to the interference power. More specifically, after a predetermined number of power levels is set based on the interference power, the signal power is compared with the power levels to determine the magnitude of the signal power. And the rate control value is determined so as to be in proportion to the magnitude of the signal power. Therefore, the lower the phase control rate of the chip sync circuit, the smaller the magnitude of the signal power relative to the interference power. In other words, the chip sync circuit controls the phase of the spreading code for tracking synchronization at intervals of a time period to produce the despreading code, the time period being variable according to the rate control value. The time period becomes shorter as the magnitude of the signal power relative to the interference power is larger and longer as the magnitude of the signal power relative to the interference power is smaller.

Therefore, by lowering the phase control rate when SIR is impaired, the error rate of receiving timing detection due to noises can be reduced, resulting in stable power control and improved communication quality.

DETAILED DESCRIPTION OF THE PREFERRED EMBODIMENT

A CDMA receiver according to the present invention is used to receive a spread spectrum signal which is subjected to spreading modulation at a transmitting system of a base station or a mobile station in a spread spectrum (SS) communications system.

Figure 1:
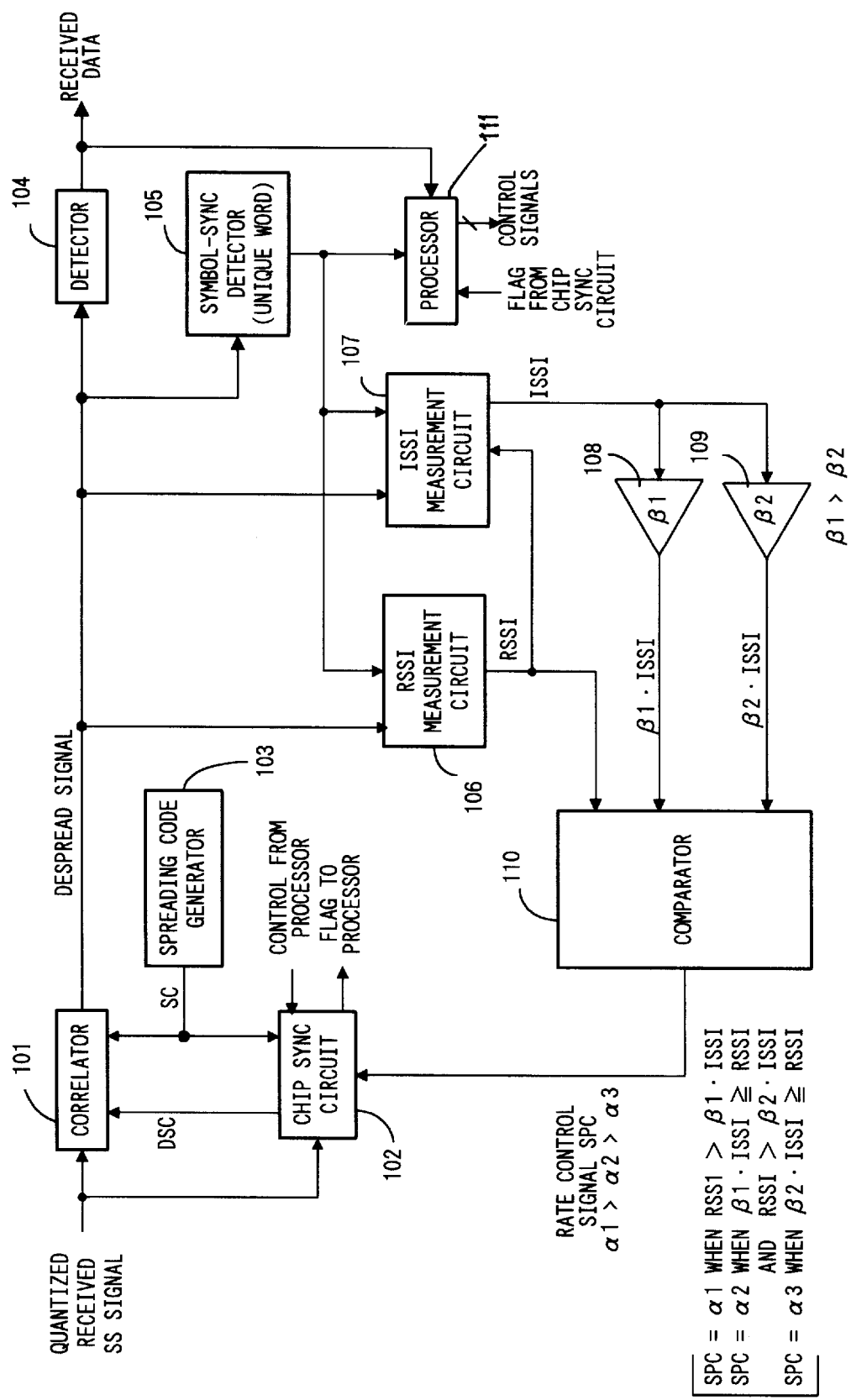
FIG. 1 is a block diagram showing an embodiment of a radio receiver according to the present invention.

Referring to FIG. 1, after a radio receiver (not shown) demodulates a received SS signal into a demodulated SS signal, the demodulated SS signal is converted into a quantized received SS signal by an analog-to-digital converter (not shown). The quantized received SS signal is output to a correlator 101 and a chip sync circuit 102.

The correlator 101 performs despreading by use of a spreading code SC generated by a spreading code generator 103 and a despread timing signal $T_{DSC}$ generated by the chip sync circuit 102. More specifically, the correlator 101 performs multiplies and accumulates the quantized received SS signal and the spreading code SC according to the despread timing signal $T_{RSC}$, and generates a symbol-rate quantized received signal, that is, a despread received signal.

The chip sync circuit 102 first searches for a chip timing providing synchronization between the quantized received SS signal and the spreading code SC while sequentially shifting the phase of the spreading code SC by a predetermined amount under the control of a processor 111. When the chip timing is found, the chip sync circuit 102 outputs a sync flag signal FLAG to the processor 111 and then outputs the despread timing signal $T_{RSC}$ to the correlator 101. After the sync acquisition, the chip sync circuit 102 enters into the sync tracking operation which is performed according to a tracking rate control signal SPC as described in detail later.

The despread signal generated by the correlator 101 in the above manner is output to a detector (or demodulator) 104 which demodulates it into received data, for example, a speech signal and a control signal. The demodulated control signal is used in the processor 111. The despread signal is also output to a symbol-sync detector 105, an RSSI measurement circuit 106, and an ISSI measurement circuit 107. The symbol-sync detector 105 detects a unique word (UW) or a pilot signal from the despread signal to establish symbol synchronization. The symbol timing signal is output to the RSSI measurement circuit 106, the ISSI measurement circuit 107, and the processor 111.

Figure 3A:
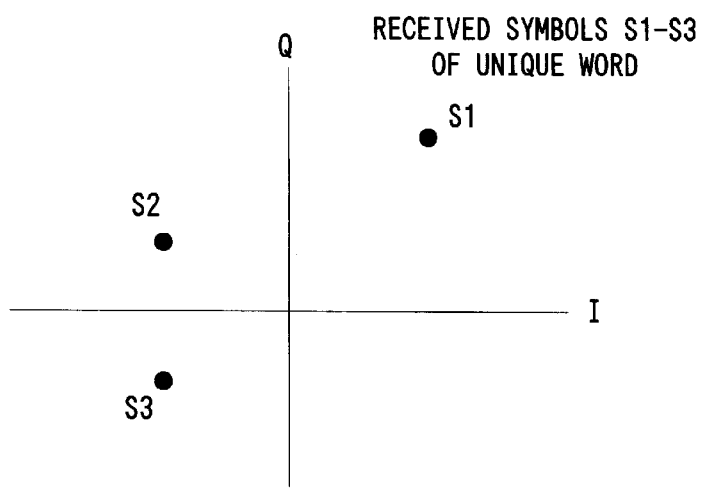
FIGS. 3A–3C are diagrams showing a vector addition and averaging method of the symbols of a received unique word in an I-Q plane.
Figure 3B:
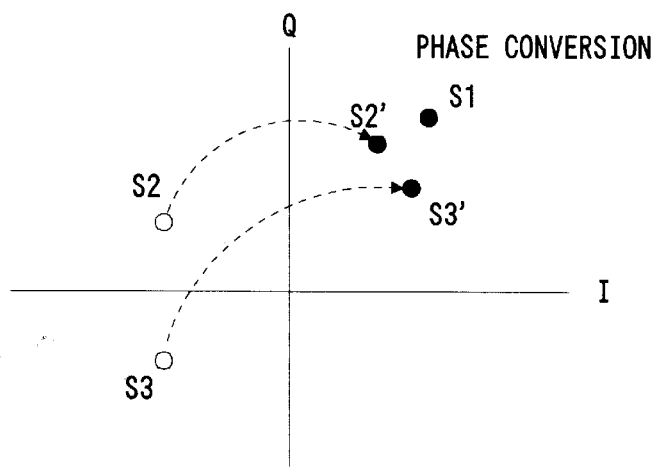
Figure 3C:
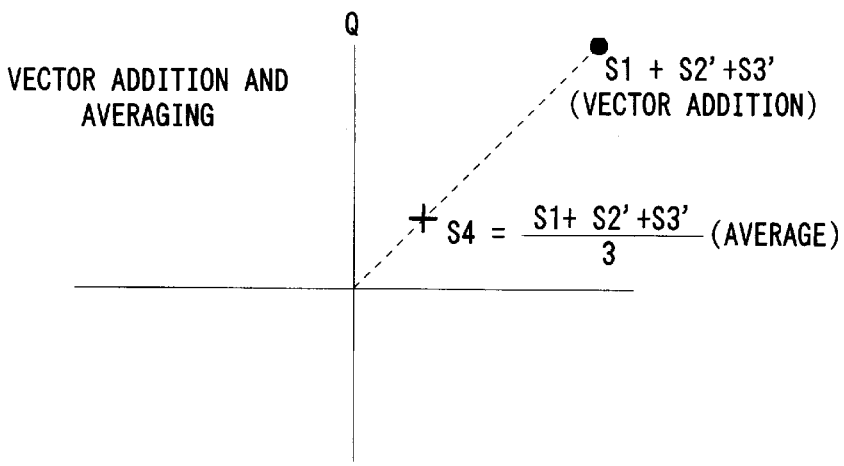

The RSSI measurement circuit 106 measures a desired signal power (hereinafter called RSSI) by inputting the symbols indicative of a unique word according to the symbol timing signal (see FIG. 3A), converting them into the same phase quadrant (see FIG. 3B) and then averaging the signal powers of the converted symbols (see FIG. 3C). That is, an in-phase vector addition is performed and then the result is averaged.

The ISSI measurement circuit 107 measures an interference signal power (hereinafter called ISSI) by inputting the symbols indicative of the unique word according to the symbol timing signal (see FIG. 3A) and then averaging the difference in power between RSSI and the received power of each symbol of the unique word. The output ISSI is provided to multipliers 108 and 109 which multiply ISSI by coefficients $\beta 1$ and $\beta 2$, respectively. It is assumed that $\beta 1$ is greater than $\beta 2$ by a predetermined amount. Therefore, the multipliers 108 and 109 provide two power levels: $\beta 1*ISSI$ and $\beta 2*ISSI$. Needless to say, three or more multipliers having respective coefficients $\beta 1, \beta 2, \beta 3, \ldots$, may be provided to set three or more power levels. It should be noted that RSSI and ISSI may be detected by other known methods.

A comparator 110 inputs RSSI from the RSSI measurement circuit 106 and further inputs the power levels $\beta 1*ISSI$ and $\beta 2*ISSI$ from the multipliers 108 and 109, respectively. The comparator 110 compares RSSI with each of $\beta 1*ISSI$ and $\beta 2*ISSI$ to produce a rate control signal SPC in accordance with the following condition. SPC is set to $\alpha 1$ when RSSI is greater than $\beta 1*ISSI$, SPC is set to $\alpha 2$ when RSSI is not greater than $\beta 1*ISSI$ but greater than $\beta 2*ISSI$, and SPC is set to $\alpha 3$ when RSSI is not greater than $\beta 2*ISSI$, where $\alpha 1 > \alpha 2 > \alpha 3$. The rate control signal SPC is output to the chip sync circuit 102 which performs the sync tracking in an operation timing clock according to the rate control signal SPC.

The processor 111 performs the whole operation control of the receiver through control signals while receiving the received control signal, the symbol sync signal, the sync flag signal FLAG and other necessary signals.

Figure 2:
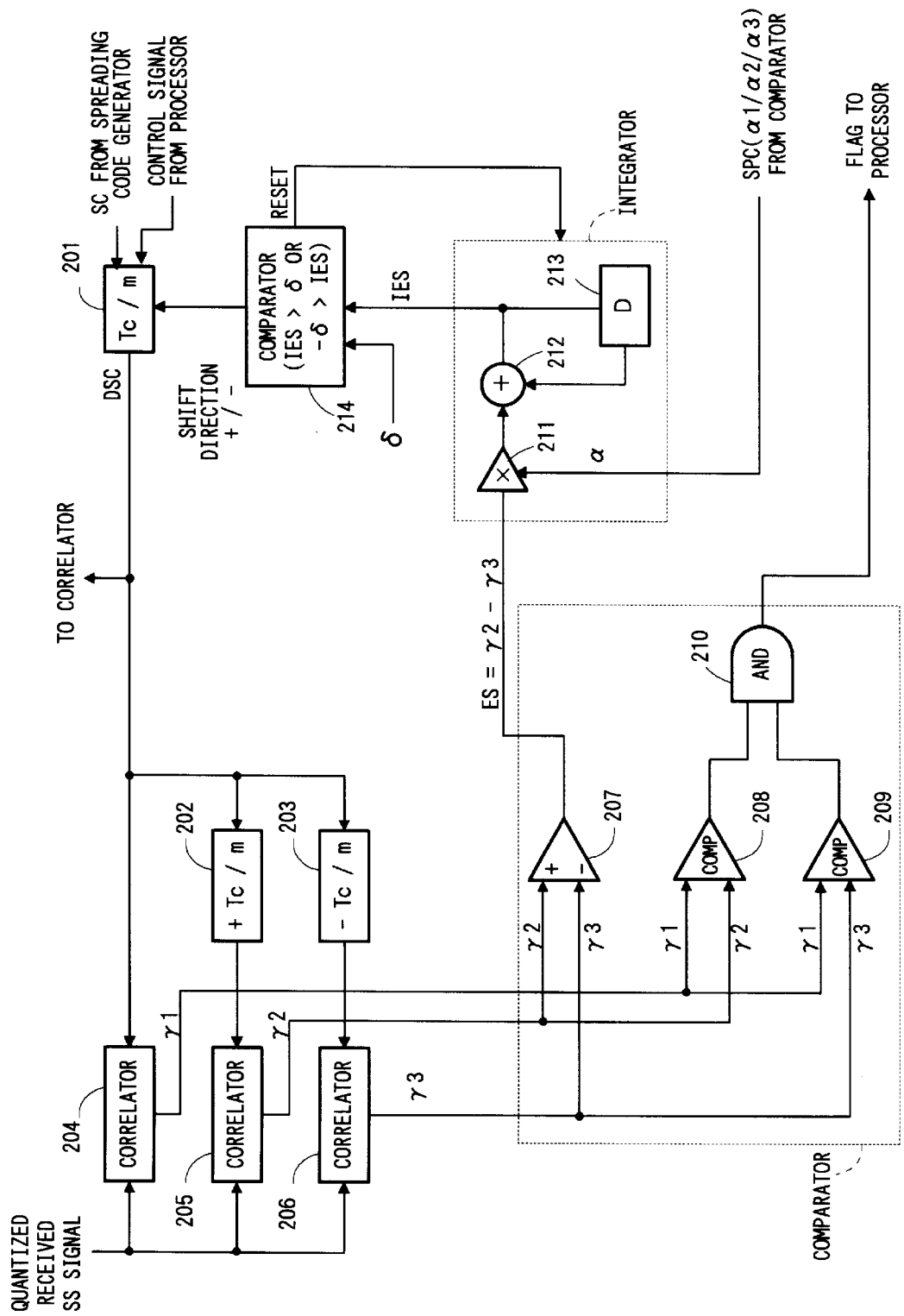
FIG. 2 is a block diagram showing an example of a chip synchronization circuit as shown in FIG. 1.

Referring to FIG. 2, the chip sync circuit 102 is comprised of a timing shift circuit 201, an early timing shift circuit 202, and a late timing shift circuit 203. The timing shift circuit 201 receives the spreading code SC from the spreading code generator 103 and shifts the phase of the spreading code SC by Tc/m, that is, 1/m chip, according to the control signal received from the processor 111 or a shift direction signal received from a comparator 214, where Tc is a chip duration and m is an integer greater than 0. The output code DSC is supplied to the early timing shift circuit 202, the late timing shift circuit 203, and a first correlator 204, further is supplied as the despread timing signal $T_{RSC}$ to the correlator 101. The early timing shift circuit 202 produces an early spreading code by shifting the phase of the spreading code SC by +Tc/n, that is, +1/n chip, and the late timing shift circuit 203 produces a late spreading code by shifting the phase of the spreading code SC by -Tc/n, that is, -1/n chip, where n is an integer greater than 0.

The first correlator 204 produces a correlation value $\gamma 1$ of the quantized received signal and the despreading code DSC received from the timing shift circuit 201. A second correlator 205 produces a correlation value $\gamma 2$ of the quantized received signal and the early spreading code received from the early timing shift circuit 202 and a third correlator 206 produces a correlation value $\gamma 3$ of the quantized received signal and the late spreading code received from the late timing shift circuit 203.

The correlation values $\gamma 2$ and $\gamma 3$ are output to a subtractor 207 which subtracts the correlation value $\gamma 3$ from the correlation value $\gamma 2$ to produce an error signal $ES = \gamma 2 - \gamma 3$. The correlation values $\gamma 1$ and $\gamma 2$ are output to a comparator 208 and the correlation values $\gamma 1$ and $\gamma 3$ are output to a comparator 209. The comparators 208 and 209 concurrently produce a logical value of 1 when the correlation value $\gamma 1$ is greater than each of the correlation values $\gamma 2$ and $\gamma 3$. Therefore, an AND gate 210 outputs a sync flag signal FLAG of 1 to the processor 111 when $\gamma 1 > \gamma 2$ and $\gamma 1 > \gamma 3$. As described before, the processor 111 is informed of the synchronization acquisition when detecting synchronization between the sync flag signal FLAG received from the AND gate 210 and the symbol sync signal received from the symbol-sync detector 105.

The error signal $ES = \gamma 2 - \gamma 3$ is output to an integrator comprising a multiplier 211, an adder 212, and a delay shift register 213 which are connected as known well. The multiplier 211 receives the error signal $ES = \gamma 2 - \gamma 3$ from the subtractor 207 and multiplies it by the magnitude $\alpha$ of the rate control signal SPC: $\alpha 1, \alpha 2,$ or $\alpha 3$ (here $\alpha 1 > \alpha 2 > \alpha 3$). In other words, the magnitude $\alpha$ of the rate control signal SPC serves as an integral coefficient or the inverse of an integral time constant. Therefore, the smaller the magnitude $\alpha$ of the rate control signal SPC, the slower the integral IES of the error signal ES increases or decreases.

A comparator 214 compares the absolute value of the integral output IES with a predetermined reference value $\delta$ to output a shift direction signal to the timing shift circuit 201. More specifically, when $IES > +\delta$, the comparator 214 output a backward shift signal SD(+) to the timing shift circuit 201 or when $IES < -\delta$, the comparator 214 output a forward shift signal SD(-) to the timing shift circuit 201. Further, when IES exceeds $+\delta$ or $-\delta$, the comparator 214 outputs a reset signal to the delay shift register 213 of the integrator to initialize the contents of the shift register 213.

Upon receiving the backward shift signal SD(+) from the comparator 214, the timing shift circuit 201 delays the phase of the spreading code SC by 1/m chip. Contrarily, upon receiving the forward shift signal SD(−), the timing shift circuit 201 advances the phase of the spreading code SC by 1/m chip.

OPERATION

During the initial sync acquisition, the timing shift circuit 201 of the chip sync circuit 102 is not controlled by the shift direction signal received from the comparator 214 but the control signal received from the processor 111. More specifically, under the control of the processor 111, the spreading code generator 103 generates the spreading code SC to output it to the correlator 101 and the timing shift circuit 201 of the chip sync circuit 102. The timing shift circuit 201 sequentially shifts the phase of the spreading code SC in units of 1/m chip until the spreading code SC is in phase with the quantized received SS signal. Upon detecting the synchronization between the sync flag signal FLAG and the symbol sync signal, the processor 111 switches the timing shift circuit 201 from sync acquisition to sync tracking.

In the sync tracking operation, the timing shift circuit 201 performs the timing shift operation according to the shift direction signal received from the comparator 214. More specifically, each time the absolute value of the integral IES of the error signal ES exceeds δ, the timing shift circuit 201 delays or advances the phase of the spreading code SC by 1/m chip. As described before, the time period elapsed before the absolute value of the integral IES of the error signal ES reaches δ is dependent on the magnitude α of the rate control signal SPC received from the comparator 110. In other words, the timing shift circuit 201 performs the timing shift operation at time intervals determined according to the rate control signal SPC. More specifically, the rate control signal SPC is set to a smaller magnitude as the ratio of RSSI to ISSI or SIR becomes lower, that is, the receiving condition becomes impaired. Therefore, in cases where SIR is impaired, the timing shift operation is performed by the timing shift circuit 201 at relatively long time intervals. In other words, the timing shift rate of the chip sync circuit 102 is changed depending on the degree of SIR impairment.

Since the timing shift rate of the chip sync circuit 102 is lower as SIR becomes lower, the receiving timing error due to noises is effectively prevented, resulting in stable receiving operation. Therefore, stable transmission power control and stable communications can be maintained even when SIR is relatively low.

What is claimed is:

1. A circuit for receiving a spread spectrum signal, comprising:

generating means for generating a spreading code;

despreading means for despreading the spread spectrum signal by using a despreading code to produce a despread signal;

phase control means for controlling a phase of the spreading code for tracking synchronization at a phase control rate to produce the despreading code, the phase control rate being variable according to a rate control value;

power detecting means for detecting a signal power and an interference power based on the despread signal;

rate control means for producing the rate control value to control the phase control rate of the phase control means based on a magnitude of the signal power relative to the interference power; and means for recovering received information from the despread signal.

2. The circuit according to claim 1, wherein the rate control means comprises:

setting means for setting a predetermined number of power levels based on the interference power, the power levels being sorted from a lowest power level to a highest power level;

comparing means for comparing the signal power with the power levels to determine the magnitude of the signal power;

means for producing the rate control value which is in proportion to the magnitude of the signal power.

3. The circuit according to claim 2, wherein the setting means comprises the predetermined number of multipliers for multiplying the interference power by different values which are sorted in ascending numeric order to produce the power levels, respectively.

4. The circuit according to claim 1, wherein the phase control rate becomes higher as the magnitude of the signal power relative to the interference power is larger.

5. The circuit according to claim 1, wherein the phase control rate becomes lower as the magnitude of the signal power relative to the interference power is smaller.

6. The circuit according to claim 1, wherein the phase control means controls the phase of the spreading code for tracking synchronization at intervals of a time period to produce the despreading code, the time period being variable according to the rate control value.

7. The circuit according to claim 6, wherein the time period becomes shorter as the magnitude of the signal power relative to the interference power is larger.

8. The circuit according to claim 6, wherein the time period becomes longer as the magnitude of the signal power relative to the interference power is smaller.

9. The circuit according to claim 1, wherein the phase control means comprises:

phase shift means for shifting the phase of the spreading code by a first predetermined fraction of a chip duration of the spreading code in a direction determined by a shift direction signal to produce the despreading code;

difference detecting means for detecting a correlation difference between an advance cross-correlation value and a retard cross-correlation value;

integral means for integrating the correlation difference with an integration time constant variable according to the rate control value to produce an integral value; and shift control means for producing the shift direction signal determined by sign of the integral value when a magnitude of the integral value exceeds a predetermined value.

10. The circuit according to claim 9, wherein the difference detecting means comprises:

first phase shift means for shifting the phase of the despreading code by a second predetermined fraction of the chip duration in an advance direction to produce a first phase-shifted code;

second phase shift means for shifting the phase of the despreading code by the second predetermined fraction of the chip duration in a retard direction to produce a second phase-shifted code;

first means performing a cross-correlation between the spread spectrum signal and the first phase-shifted code to produce the advance cross-correlation value;

second means performing a cross-correlation between the spread spectrum signal and the second phase-shifted code to produce the retard cross-correlation value; and means for producing the correlation difference between the advance cross-correlation value and the retard cross-correlation value.

11. A method for receiving a spread spectrum signal, comprising the steps of:

a) generating a spreading code;

b) despreading the spread spectrum signal by using a despreading code to produce a despread signal;

c) controlling a phase of the spreading code for tracking synchronization at a phase control rate to produce the despreading code, the phase control rate being variable according to a rate control value;

d) detecting a signal power and an interference power based on the despread signal;

e) producing the rate control value to control the phase control rate based on a magnitude of the signal power relative to the interference power; and f) recovering received information from the despread signal.

12. The method according to claim 11, wherein the step e) comprises the steps of:

setting a predetermined number of power levels based on the interference power, the power levels being sorted from a lowest power level to a highest power level;

comparing the signal power with the power levels to determine the magnitude of the signal power;

producing the rate control value which is in proportion to the magnitude of the signal power.

13. The method according to claim 12, wherein the interference power is multiplied by different values which are sorted in ascending numeric order to produce the power levels, respectively.

14. The method according to claim 11, wherein the phase control rate becomes lower as the magnitude of the signal power relative to the interference power is smaller.

15. The method according to claim 11, wherein the phase of the spreading code for tracking synchronization is controlled at intervals of a time period to produce the despreading code, the time period being variable according to the rate control value.

16. The method according to claim 15, wherein the time period becomes longer as the magnitude of the signal power relative to the interference power is smaller.

17. The circuit according to claim 1, further comprising:

detecting means for detecting symbol-synchronization from the despread signal to produce a symbol-synchronization signal; and control means for controlling synchronization acquisition.

18. The circuit according to claim 17, wherein the phase control means further comprises:

third means performing a cross-correlation between the spread spectrum signal and the despread code to produce a cross-correlation value; and flag means for producing a flag when the cross-correlation value is greater than each of the advance cross-correlation value and the retard cross-correlation value, wherein the control means controls the phase control means such that the phase of the spreading code is sequentially shifted for the synchronization acquisition until the flag is in synchronization with the symbol synchronization signal, and then switches to the synchronization tracking when the flag is in synchronization with the symbol synchronization signal.

19. The circuit according to claim 17, wherein the power detecting means detects the signal power based on a unique word which is read from the despread signal according to the symbol synchronization signal, and detects the interference power based on the unique word.

20. The circuit according to claim 19, wherein the signal power is obtained by inputting a plurality of symbols of the unique word according to the symbol synchronization signal, converting the symbols into a predetermined quadrant of a signal constellation plane, adding and averaging powers of the symbols.

21. The circuit according to claim 20, wherein the interference power is obtained by inputting the symbols of the unique word according to the symbol synchronization signal, calculating and averaging a difference between the signal power and each power of the symbols.

22. A CDMA receiver comprising the circuit according to claim 1.

23. A CDMA receiver comprising the circuit according to claim 9.

24. A CDMA receiver comprising the circuit according to claim 18.

25. A CDMA receiver comprising the circuit according to claim 19.

* * * * *